US008908397B2

(12) United States Patent
Barbosa et al.

(10) Patent No.: US 8,908,397 B2
(45) Date of Patent: Dec. 9, 2014

(54) POWER MODULE AND POWER CONVERSION APPARATUS

(75) Inventors: Peter Barbosa, Taoyuan Hsien (TW); Yong-Qiang Lang, Taoyuan Hsien (TW); Wei Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 259 days.

(21) Appl. No.: 13/468,426

(22) Filed: May 10, 2012

(65) Prior Publication Data

US 2013/0242624 A1     Sep. 19, 2013

(30) Foreign Application Priority Data

Mar. 14, 2012  (CN) .......................... 2012 1 0065754

(51) Int. Cl.
*H02M 5/458*  (2006.01)

(52) U.S. Cl.
USPC .............................................. 363/37; 363/67

(58) Field of Classification Search
CPC .................................................. H02M 5/4585
USPC ........... 363/37, 65, 67, 71, 34–36, 84, 87, 92, 363/125
See application file for complete search history.

(56) References Cited

U.S. PATENT DOCUMENTS

| | | | | |
|---|---|---|---|---|
| 6,154,378 A | * | 11/2000 | Peterson et al. | ................. 363/37 |
| 6,266,260 B1 | * | 7/2001 | Zahrte et al. | ................... 363/132 |
| 6,301,130 B1 | | 10/2001 | Aiello et al. | |
| 6,548,985 B1 | * | 4/2003 | Hayes et al. | ................... 320/108 |
| 7,327,587 B2 | * | 2/2008 | Mhaskar et al. | ................ 363/37 |
| 2003/0053324 A1 | * | 3/2003 | Yamamoto et al. | ........... 363/127 |

FOREIGN PATENT DOCUMENTS

JP        2005110336 A  *  4/2005

* cited by examiner

*Primary Examiner* — Harry Behm

(74) *Attorney, Agent, or Firm* — Muncy, Geissler, Olds & Lowe, P.C.

(57) ABSTRACT

A power module, which is connected to a power source, includes a rectifying unit, a filtering unit and an inverter. The rectifying unit has three legs. The filtering unit is connected to the rectifying unit, and the inverter is connected to the filtering unit. One of the three legs has two switching elements connected in series, and another one of the three legs has two rectifying elements connected in series. In addition, a power conversion apparatus including the power module is also disclosed.

4 Claims, 10 Drawing Sheets

POWER MODULE AND POWER CONVERSION APPARATUS

CROSS REFERENCE TO RELATED APPLICATIONS

This Non-provisional application claims priority under 35 U.S.C. §119(a) on Patent Application No(s). 201210065754.6 filed in People's Republic of China on Mar. 14, 2012, the entire contents of which are hereby incorporated by reference.

BACKGROUND OF THE INVENTION

1. Field of Invention

The present invention relates to a power module and a power conversion apparatus.

2. Related Art

Recently, the power technology has been developed and applied to various fields such as electricity power, chemical engineering, and communication. Regarding to the electricity power field, there are mainly a single-phase power system and a three-phase power system, which is applied to most industries.

FIG. 1A is a schematic diagram showing a conventional three-phase power conversion apparatus disclosed in U.S. Pat. No. 6,301,130. As shown in FIG. 1A, the power conversion apparatus 1 is cooperated with a load M, and includes a primary circuit 11 and a plurality of secondary circuits 12. The primary circuit 11 includes a primary winding $W_1$. The secondary circuits 12 are coupled with the primary circuit 11, respectively, and each secondary circuit 12 includes a secondary winding $W_2$ and a power module 121.

FIG. 1B is a schematic diagram showing a conventional power module disclosed in U.S. Pat. No. 6,301,130. As shown in FIG. 1B, the power module 121 includes a rectifying unit Rec composed of several active switching elements SW. Although the conventional power module 121 can modulate the current to sine wave or substantially sine wave without configuring additional auxiliary circuit for phase shift, the circuit structure thereof is still very complex since the power module 121 is configured with many switching elements SW. Accordingly, the reliabilities of the power module 121 and the power conversion apparatus 1 are threatened.

Therefore, it is an important subject of the present invention to provide a power module and a power conversion apparatus that have a simplified circuit design as well as increased reliabilities.

SUMMARY OF THE INVENTION

In view of the foregoing, an object of the present invention is to provide a power module and a power conversion apparatus that have a simplified circuit design, thereby increasing their reliabilities.

To achieve the above object, the present invention discloses a power module comprising a rectifying unit, a filtering unit and an inverter. The power module is connected to a power source. The rectifying unit comprises three legs. The filtering unit is connected to the rectifying unit, and the inverter is connected to the filtering unit. One of the three legs comprises two switching elements, which are connected in series, and another one of the three legs comprises two rectifying elements, which are connected in series.

In one embodiment of the present invention, each rectifying element is a diode, and the switching element is a semiconductor switch.

In one embodiment of the present invention, the other one of the three legs comprises two rectifying elements connected in series.

In one embodiment of the present invention, the filtering unit comprises a first capacitor, a second capacitor and a neutral point. The second capacitor is electrically connected in series with the first capacitor, and the neutral point is disposed between the first capacitor and the second capacitor and electrically connected to the power source.

To achieve the above object, the present invention discloses a power module including a rectifying unit, a filtering unit, and an inverter. The power module is connected to a power source. The rectifying unit comprises three legs. The filtering unit is connected to the rectifying unit, and the inverter is connected to the filtering unit. The rectifying unit, the filtering unit and the inverter are connected in sequence. Herein, one of the three legs comprises two switching elements connected in series, and another one of the three legs comprises two rectifying elements connected in series.

In one embodiment, the other one of the three legs of the rectifying unit comprises two switching elements connected in series.

In one embodiment, the filtering unit comprises a capacitor connected to the three legs in parallel.

To achieve the above object, the present invention also discloses a power conversion apparatus including a primary circuit and a plurality of secondary circuits. The primary circuit is connected to an AC power source and comprises a primary winding. The secondary circuits are coupled to the primary circuit, respectively. Each secondary circuit comprises a secondary winding and at least one power module corresponding to one output phase. The power module comprises a rectifying unit, a filtering unit and an inverter. The rectifying unit is connected to the secondary winding and comprises three legs. The filtering unit is connected to the rectifying unit in parallel, and the inverter is connected to the filtering unit in parallel. One of the three legs comprises two switching elements connected in series, and another one of the three legs comprises two rectifying elements connected in series.

In one embodiment of the present invention, the other one of the three legs of the rectifying unit comprises two switching elements or two rectifying elements connected in series.

In one embodiment, different rectifying units of different power modules corresponding to different output phases comprise the legs, which have two switching elements, configured at different relative positions.

In one embodiment, different rectifying units of different power modules corresponding to same phase comprise the legs, which have two switching elements, configured at the same relative positions.

In one embodiment of the present invention, the filtering unit comprises a first capacitor, a second capacitor and a neutral point. The second capacitor is electrically connected in series with the first capacitor. The neutral point is disposed between the first capacitor and the second capacitor and electrically connected to the secondary winding.

In one embodiment, different rectifying units of different power modules corresponding to different output phases comprise the legs, which have two rectifying elements, configured at different relative positions.

In one embodiment, different rectifying units of different power modules corresponding to same output phase comprise the legs, which have two rectifying elements, configured at the same relative positions.

In one embodiment of the present invention, the filtering unit comprises a capacitor connected to the three legs in parallel.

As mentioned above, the power module and power conversion apparatus of the present invention is configured with a rectifying unit having three legs, wherein one of the three legs has two switching elements and another one of the three legs has two rectifying elements. According to this configuration, the circuit design of the power module and power conversion apparatus can be simplified, thereby increasing their reliabilities.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
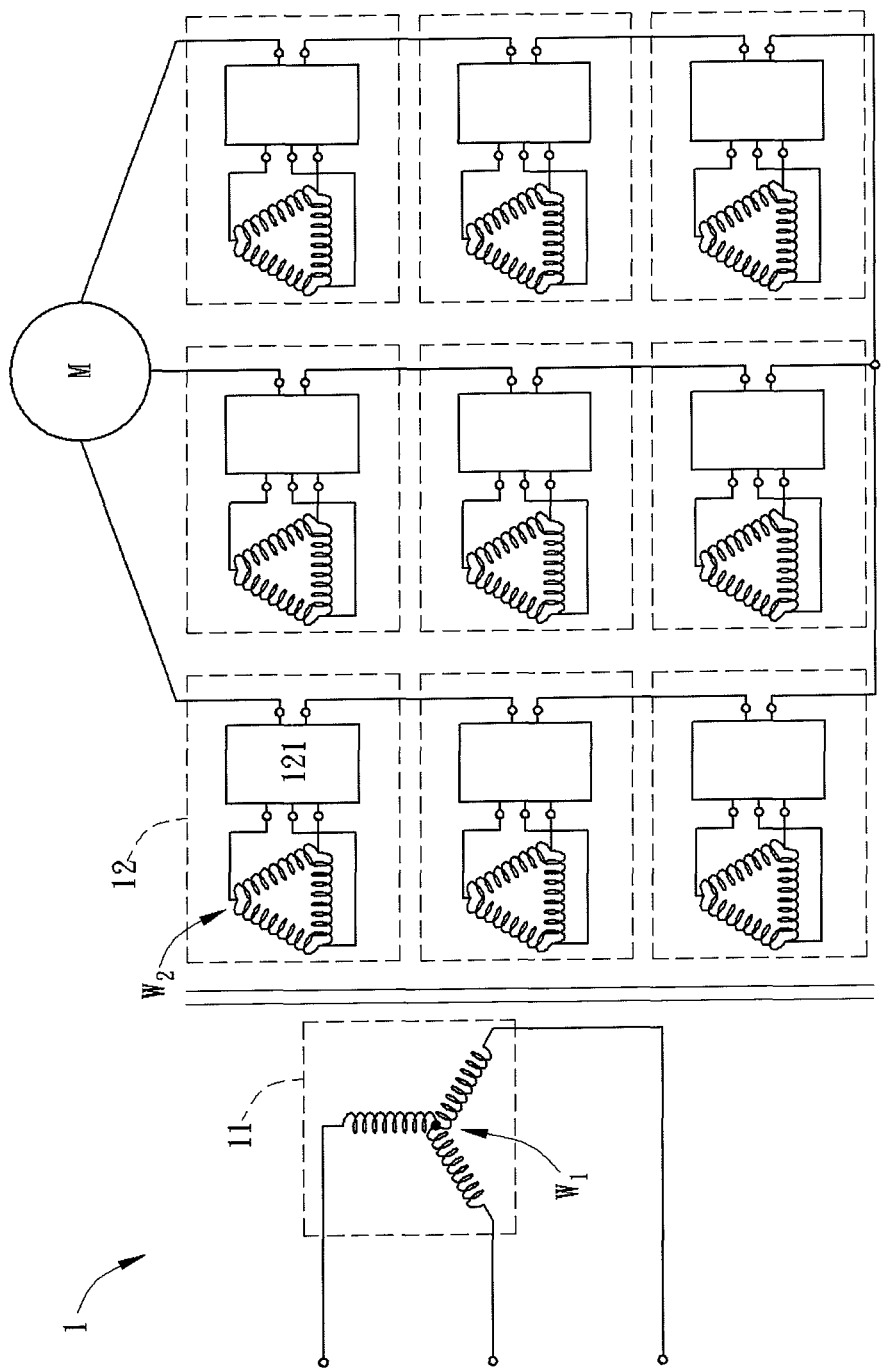
FIG. 1A is a schematic diagram showing a conventional power conversion apparatus.
Figure 1B:
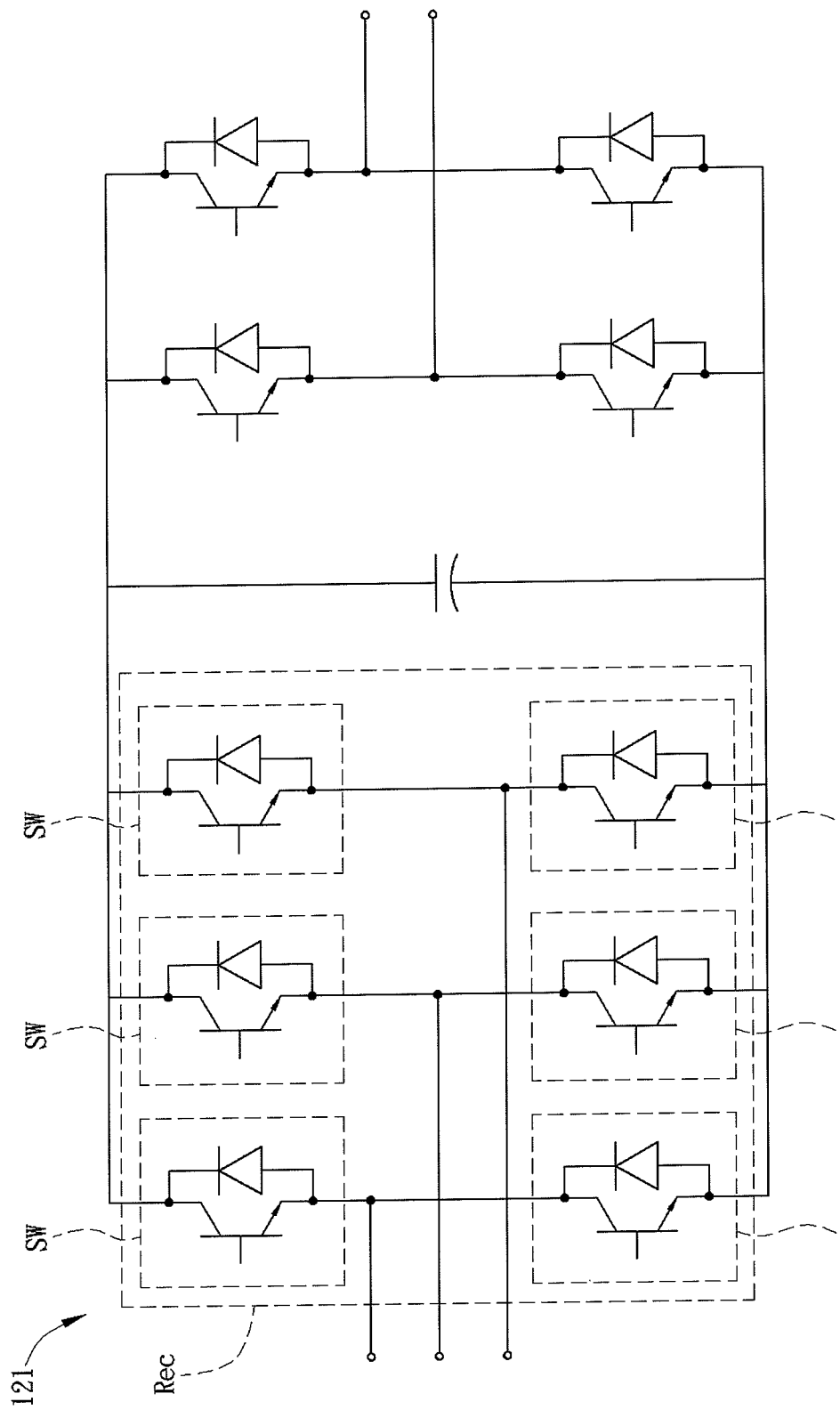
FIG. 1B is a schematic diagram showing a conventional power module.
Figure 2A:
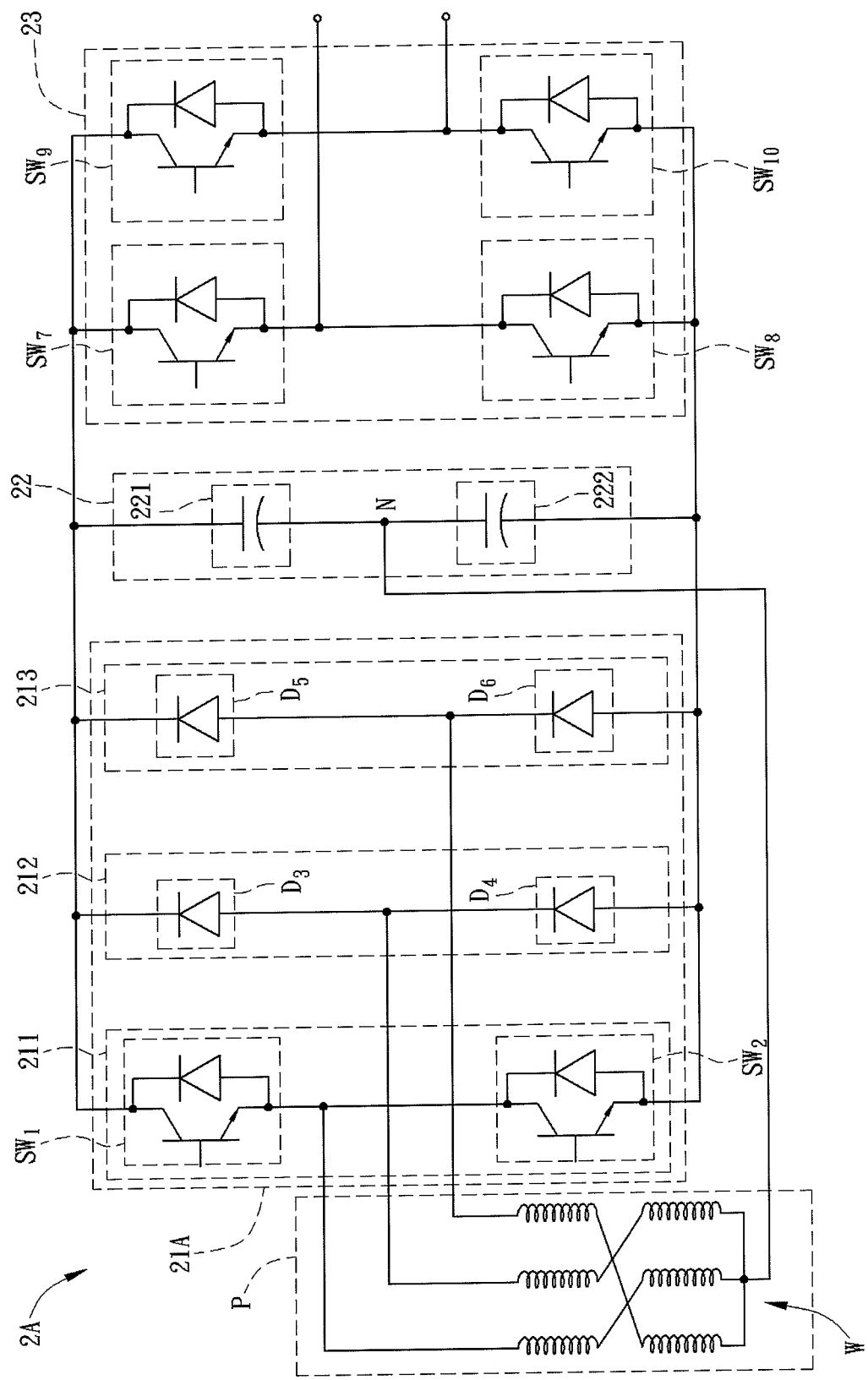
FIG. 2A is a schematic diagram showing a power module according to a preferred embodiment of the present invention.

FIG. 2A is a schematic diagram showing a power module 2A according to a preferred embodiment of the present invention. Referring to FIG. 2A, the power module 2A is electrically connected with a power source P for receiving the power signal from the power source P. After the power conversion, the power signal is provided to a load (not shown), such as a motor. The power source P is, for example, an alternating-current (AC) power source. In this embodiment, the power source P includes a winding W, which is in the Y-zigzag connection.

The power module 2A comprises a rectifying unit 21A, a filtering unit 22 and an inverter 23. The rectifying unit 21A comprises three legs 211, 212 and 213. In this embodiment, the legs 211, 212 and 213 are connected to each other in parallel and are electrically connected with the power source P.

In this embodiment, the leg 211 comprises two switching elements $SW_1$ and $SW_2$, which are connected in series. The leg 212 comprises two rectifying elements $D_3$ and $D_4$, which are connected in series. The leg 213 comprises two rectifying elements $D_5$ and $D_6$, which are connected in series. In practice, each of the rectifying elements $D_3$ and $D_4$ of the leg 212 and the rectifying elements $D_5$ and $D_6$ of the leg 213 is a passive component such as a diode, and each of the switching elements $SW_1$ and $SW_2$ of the leg 211 is an active semiconductor switch such as an insulated-gate bipolar transistor (IGBT).

The filtering unit 22 is connected to the rectifying unit 21A in parallel, and comprises a first capacitor 221, a second capacitor 222, and a neutral point N. The first capacitor 221 and the second capacitor 222 are serially connected. The neutral point N is disposed between the first capacitor 221 and the second capacitor 222, and is electrically connected with the power source P. In this embodiment, the first capacitor 221 and the second capacitor 222 are functioned as DC link capacitors.

The inverter 23 is connected to the filtering unit 22 in parallel, and comprises four switching elements $SW_7$, $SW_8$, $SW_9$ and $SW_{10}$. The inverter 23 can receive and convert the DC or substantial DC power signal outputted from the filtering unit 22, and then output the AC power signal to the load.

When the load (motor) is operated in a normal operation mode, the leg 212 composed of the rectifying elements $D_3$ and $D_4$ and the leg 213 composed of the rectifying elements $D_5$ and $D_6$ rectify the power signal outputted from the power source P, and then the filtering unit 22 and the inverter 23 execute the power conversion, followed by outputting the AC power signal to the load. At the same time, the leg 211 composed of the switching elements $SW_1$ and $SW_2$ is in a non-function state.

When the load (motor) is breaking and generates a back EMF, the leg 211 composed of the switching elements $SW_1$ and $SW_2$ functions to provide a current path for returning the back EMF to the power network. This configuration can prevent the voltages of the first capacitor 221 and the second capacitor 222 from exceeding their rated values. At the same time, the legs 212 and 213 are in a non-function state.

According to the above-mentioned structure, the rectifying unit 21A of the power module 2A includes only two switching elements $SW_1$ and $SW_2$, so the entire circuit design can be obviously simplified, thereby increasing the reliability thereof. Besides, the power module 2A also has the function of power recovery so as to control the back EMF energy of the motor.

Figure 2B:
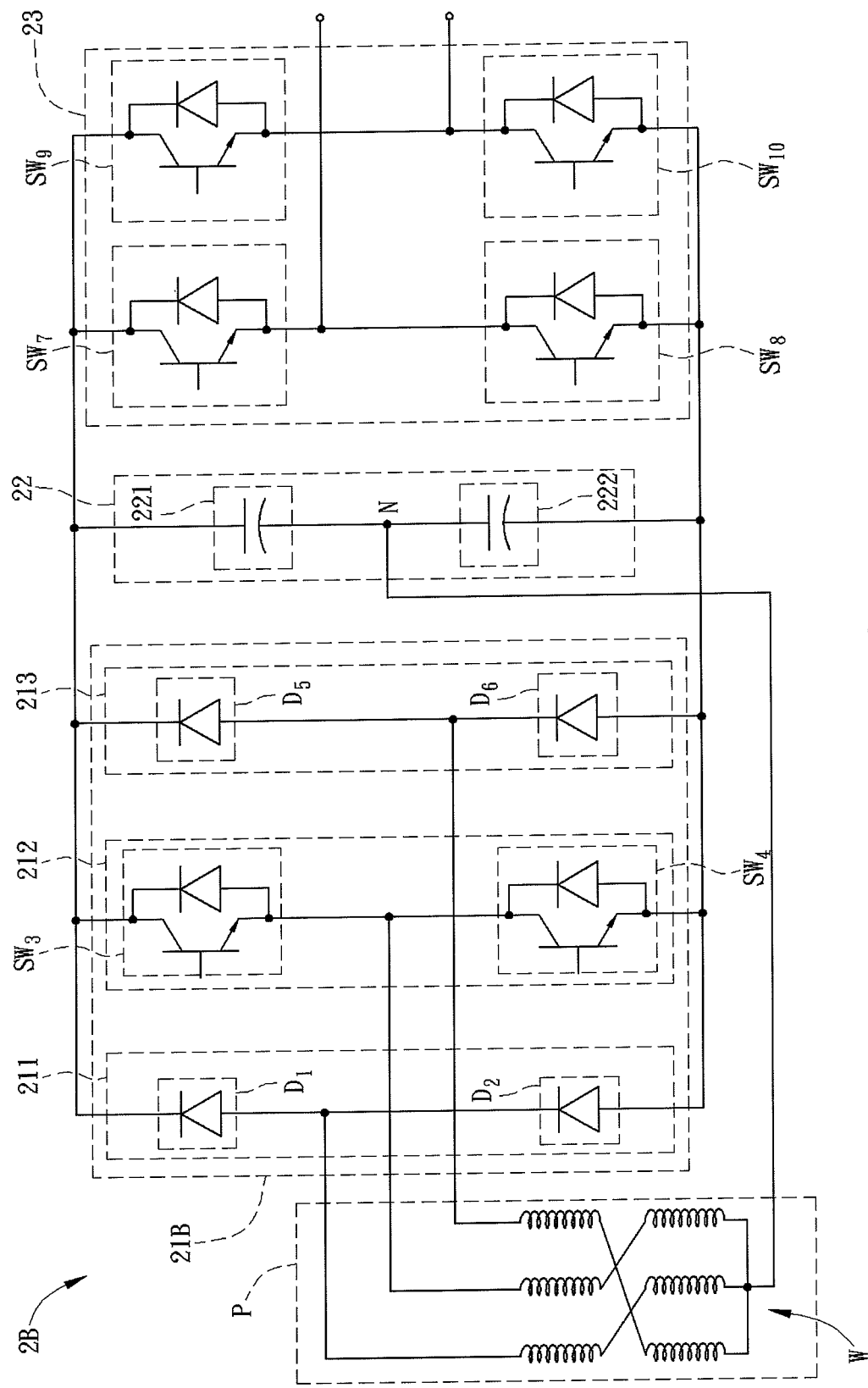
FIGS. 2B and 2C are schematic diagrams showing different aspects of the power module according to the preferred embodiment of the present invention.
Figure 2C:
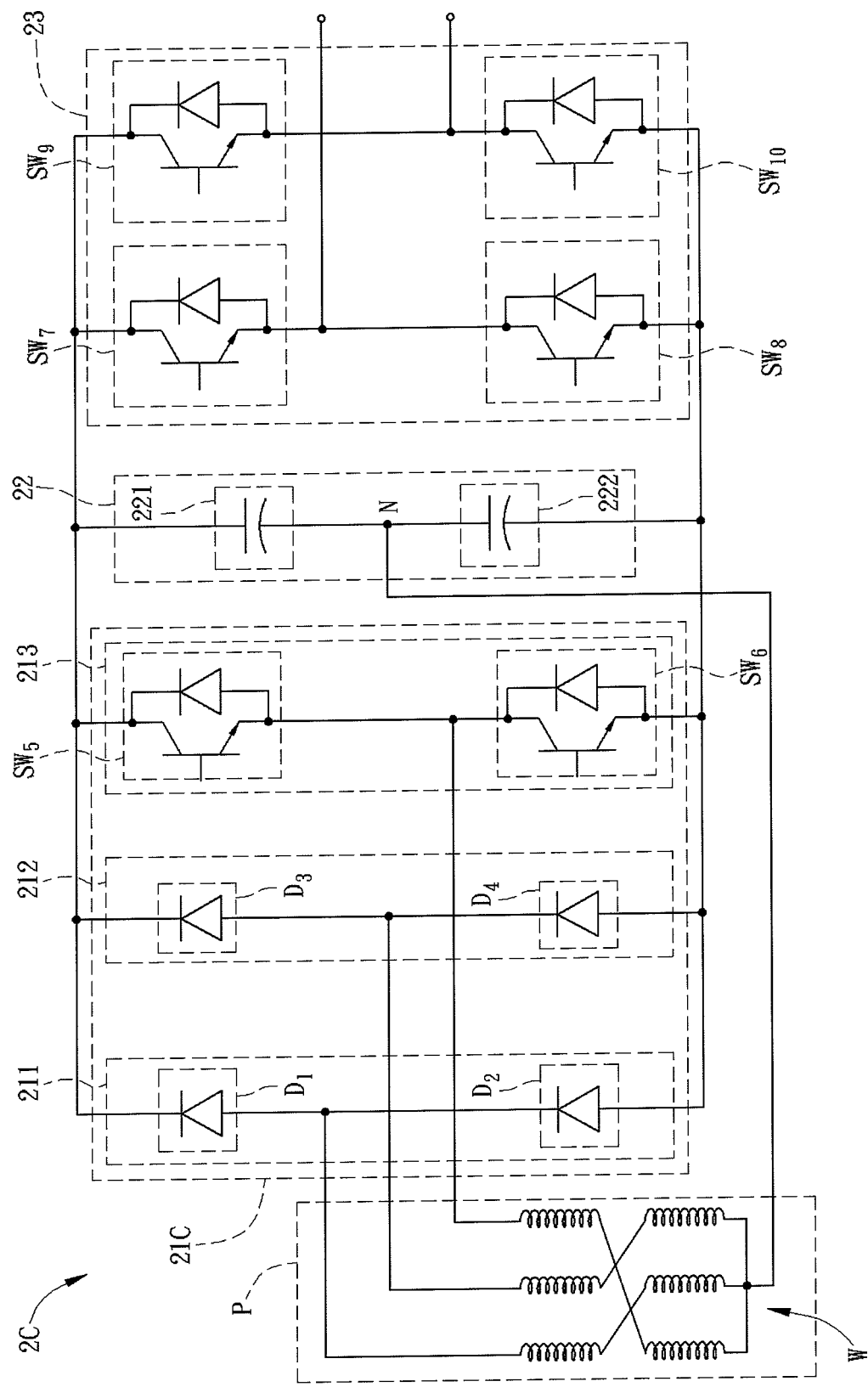

FIGS. 2B and 2C are schematic diagrams showing different aspects of the power module. As shown in FIG. 2B, a power module 2B comprises a rectifying unit 21B, a filtering unit 22 and an inverter 23. In the rectifying unit 21B, the leg 211 comprises two rectifying elements $D_1$ and $D_2$, which are connected in series. The leg 212 comprises two switching elements $SW_3$ and $SW_4$, which are connected in series. The leg 213 comprises two rectifying elements $D_5$ and $D_6$, which are connected in series. Comparing the power module 2A and 2B, the leg 212 in the rectifying unit 21B comprises two switching elements, while the first leg 211 in the rectifying unit 21A comprises two switching elements. In brief, the leg 211 of the rectifying unit 21A corresponds to the first output phase of the power source, but the leg 212 of the rectifying unit 21B corresponds to the second output phase of the power source.

Referring to FIG. 2C, a power module 2C comprises a rectifying unit 21C, a filtering unit 22 and an inverter 23. In the rectifying unit 21C, the leg 211 comprises two rectifying elements $D_1$ and $D_2$, which are connected in series. The leg 212 comprises two rectifying elements $D_3$ and $D_4$, which are connected in series. The leg 213 comprises two switching elements $SW_5$ and $SW_6$, which are connected in series. The difference between the power modules 2A and 2C is in that the leg 213 in the rectifying unit 21C of the power module 2C corresponds to the third phase of the power source.

Figure 3:
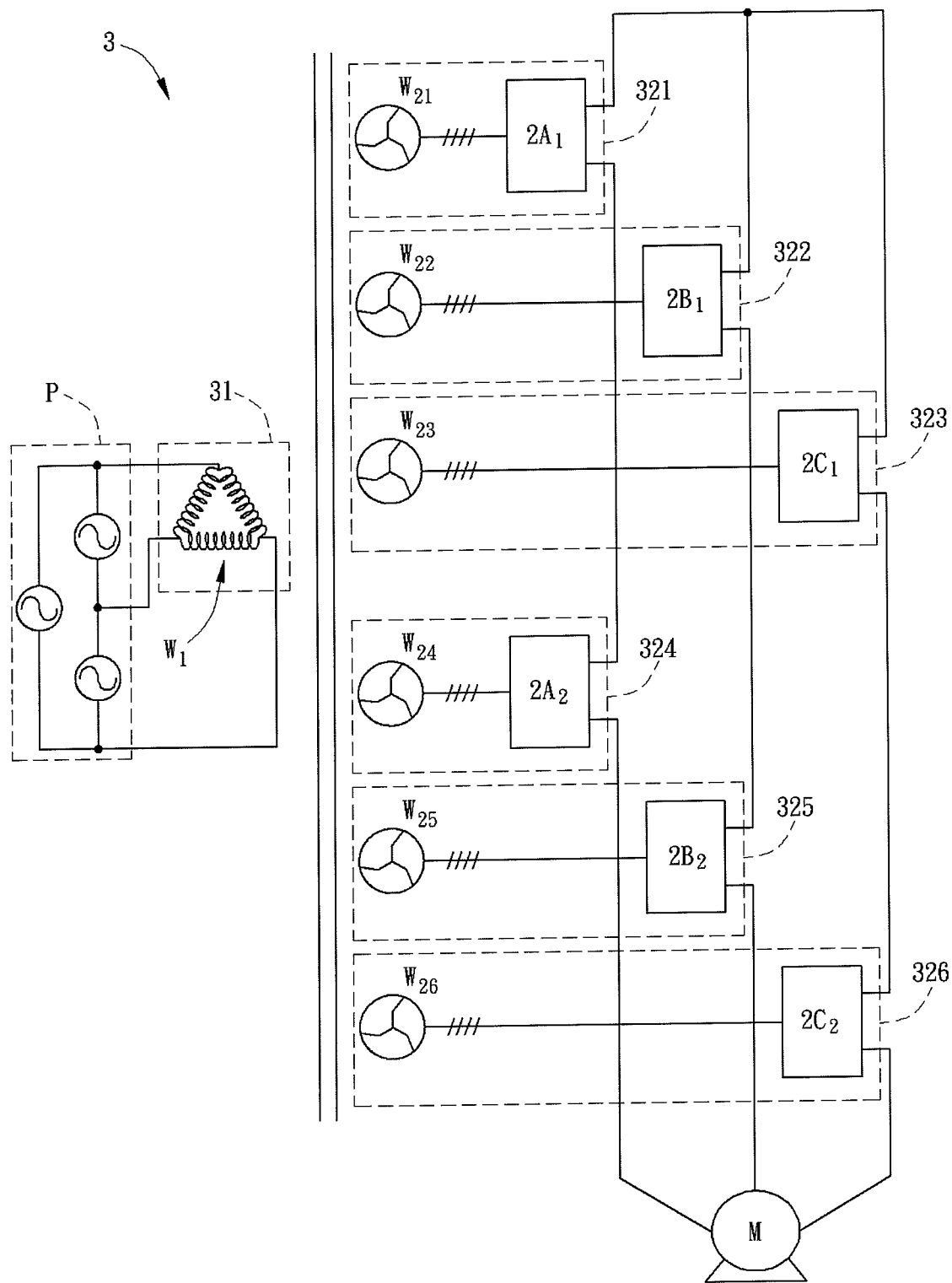
FIG. 3 is a schematic diagram showing a power conversion apparatus according to the preferred embodiment of the present invention.

A power conversion apparatus 3 will be described hereinafter with reference to FIG. 3 in view of FIGS. 2A to 2C. The power conversion apparatus 3 is cooperated with a load M for providing the operation voltage to the load M. In this embodiment, the load M is a motor. The power conversion apparatus 3 comprises a primary circuit 31 and six secondary circuits (including a first secondary circuit 321, a second secondary circuit 322, a third secondary circuit 323, a fourth secondary circuit 324, a fifth secondary circuit 325, and a sixth secondary circuit 326).

The primary circuit 31 is connected to an AC power source P and comprises a primary winding $W_1$. In this embodiment, the AC power source P is a multiphase AC power source (e.g. a three-phase AC power source). The secondary circuits 321~326 are coupled to the primary circuit 31, respectively. Each secondary circuit comprises a secondary winding and a power module. For example, the first secondary circuit 321 comprises a secondary winding $W_{21}$ and a power module $2A_1$. The second secondary circuit 322 comprises a secondary winding $W_{22}$ and a power module $2B_1$. The third secondary circuit 323 comprises a secondary winding $W_{23}$ and a power module $2C_1$. The fourth secondary circuit 324 comprises a secondary winding $W_{24}$ and a power module $2A_2$. The fifth secondary circuit 325 comprises a secondary winding $W_{25}$ and a power module $2B_2$. The sixth secondary circuit 326 comprises a secondary winding $W_{26}$ and a power module $2C_2$. Each of the power module $2A_1$, $2B_1$, $2C_1$, $2A_2$, $2B_2$, and $2C_2$ corresponds to at least one output phase.

In this embodiment, the power module $2A_1$ of the first secondary circuit 321 and the power module $2A_2$ of the fourth secondary circuit 324 are configured as the power module 2A shown in FIG. 2A, the power module $2B_1$ of the second secondary circuit 322 and the power module $2B_2$ of the fifth secondary circuit 325 are configured as the power module 2B shown in FIG. 2B, and the power module $2C_1$ of the third secondary circuit 323 and the power module $2C_2$ of the sixth secondary circuit 326 are configured as the power module 2C shown in FIG. 2C.

Since the power modules $2A_1$ and $2A_2$ are corresponding to the same output phase, the legs of the power modules $2A_1$ and $2A_2$ having two rectifying elements are configured at the same relative positions, and the legs of the power modules $2A_1$ and $2A_2$ having two switching elements are also configured at the same relative positions. In addition, since the power module $2A_1$ corresponds to the output phase different from that of the other power modules $2B_1$, $2C_1$, $2B_2$, and $2C_2$, the leg of the power module $2A_1$ having two switching elements is configured at different relative positions from the legs of the power modules $2B_1$, $2C_1$, $2B_2$, and $2C_2$ having two switching elements.

To be noted, the power modules $2A_2$, $2B_1$, $2B_2$, $2C_1$, and $2C_2$ are all have similar properties. In other words, the power modules in the secondary circuit that correspond to the same output phase have the rectifying units with three legs configured at the same relative positions, while the power modules in the secondary circuit that correspond to different output phase have the rectifying units with three legs configured at different relative positions.

The output terminal of the power module $2A_1$ of the first secondary circuit 321 is electrically connected with the output terminals of the power module $2B_1$ of the second secondary circuit 322 and the power module $2C_1$ of the third secondary circuit 323. The other output terminal of the power module $2A_1$ of the first secondary circuit 321 is electrically connected with the output terminal of the power module $2A_2$ of the fourth secondary circuit 324. The other output terminals of the power module $2B_1$ of the second secondary circuit 322 and the power module $2C_1$ of the third secondary circuit 323 are electrically connected with the output terminals of the power module $2B_2$ of the fifth secondary circuit 325 and the power module $2C_2$ of the sixth secondary circuit 326, respectively. The other output terminals of the power module $2A_2$ of the fourth secondary circuit 324, the power module $2B_2$ of the fifth secondary circuit 325 and the power module $2C_2$ of the sixth secondary circuit 326 are electrically connected with the load M.

As mentioned above, the legs 211 of the rectifying units 21A of the power modules $2A_1$ and $2A_2$ are composed of active switching elements $SW_1$ and $SW_2$; the legs 212 of the rectifying units 21B of the power modules $2B_1$ and $2B_2$ are composed of active switching elements $SW_3$ and $SW_4$; the legs 213 of the rectifying units 21C of the power modules $2C_1$ and $2C_2$ are composed of active switching elements $SW_5$ and $SW_6$. In this embodiment, the legs 211, 212 and 213 of the power modules $2A_1$, $2A_2$, $2B_1$, $2B_2$, $2C_1$ and $2C_2$ of the secondary circuits 321~326 are configured corresponding to the output phase one by one, so that the three-phase current can be balanced. That is, the phase voltages of the three-phase power source are in a symmetric configuration.

Figure 4A:
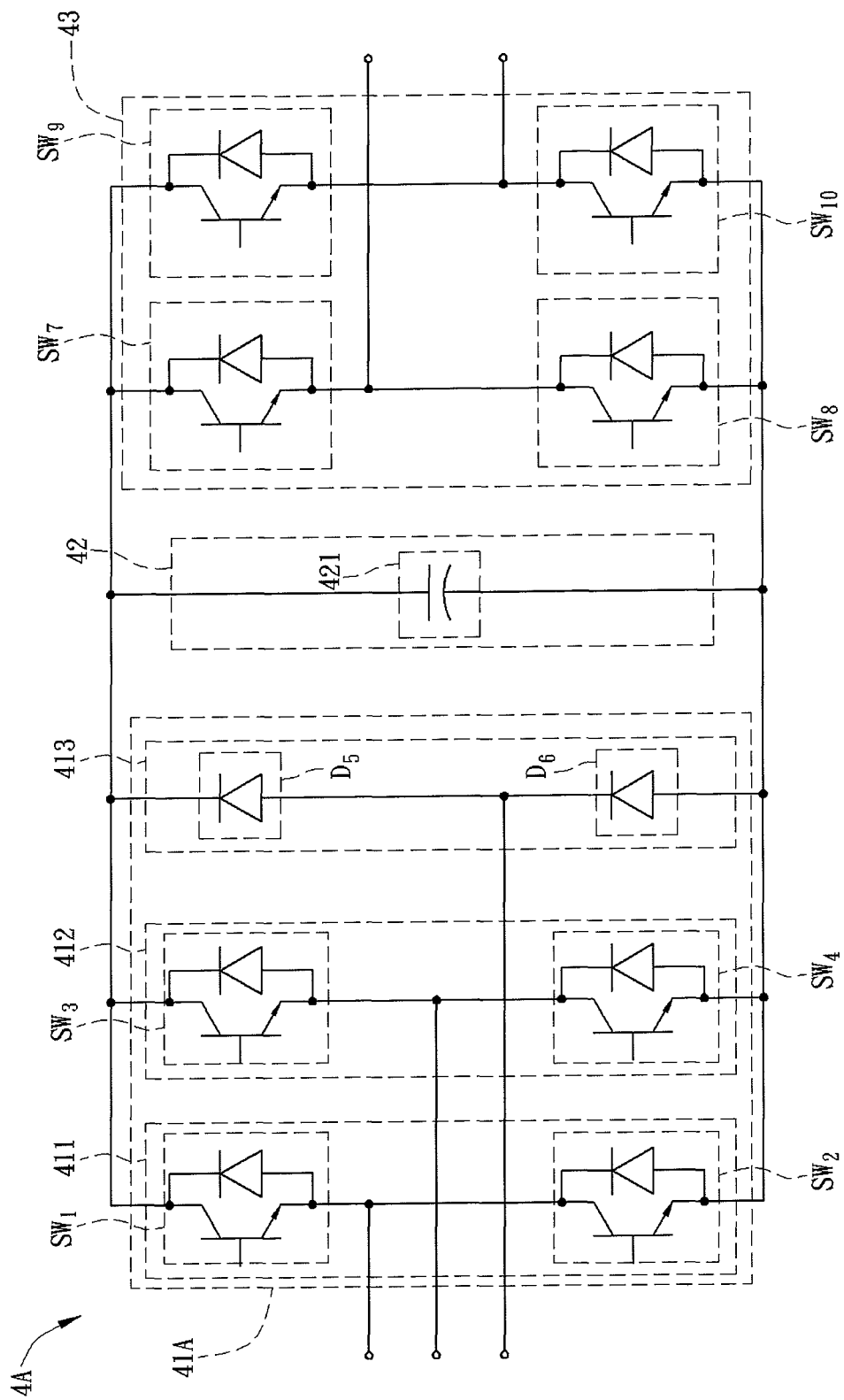
FIG. 4A is a schematic diagram showing another power module according to a preferred embodiment of the present invention.

FIG. 4A is a schematic diagram showing another power module 4A according to a preferred embodiment of the present invention. As shown in FIG. 4A, the power module 4A comprises a rectifying unit 41A, a filtering unit 42 and an inverter 43. The rectifying unit 41A comprises three legs 411, 412 and 413. In this embodiment, the legs 411, 412 and 413 are connected to each other in parallel.

In this embodiment, the leg 411 comprises two switching elements $SW_1$ and $SW_2$, which are connected in series. The leg 412 comprises two switching elements $SW_3$ and $SW_4$, which are connected in series. The leg 413 comprises two rectifying elements $D_5$ and $D_6$, which are connected in series. In practice, each of the rectifying elements $D_5$ and $D_6$ is a passive component such as a diode, and each of the switching elements $SW_1$, $SW_2$, $SW_3$ and $SW_4$ is an active semiconductor switch such as an insulated-gate bipolar transistor (IGBT).

The filtering unit 42 is connected to the rectifying unit 41A in parallel, and comprises a capacitor 421. The capacitor 421 is connected to three legs 411, 412 and 413 in parallel, and it is functioned as a DC link capacitor. The inverter 43 is connected to the filtering unit 42, and comprises four switching elements $SW_7$, $SW_8$, $SW_9$ and $SW_{10}$. The inverter 43 can receive and convert the DC or substantial DC power signal outputted from the filtering unit 42, and then output the AC power signal to the load. The rectifying unit 41A, the filtering unit 42 and the inverter 43 are connected in sequence.

Comparing the power modules 2A and 4A, the rectifying unit 41A of the power module 4A comprises the legs 411 and 412 both composed of two switching elements, and a leg 413 composed of two rectifying elements $D_5$ and $D_6$. Besides, the filtering unit 42 includes only one capacitor 421, so that the neutral point is unnecessary.

When the load (motor) is operated in a normal operation mode, the switching elements $SW_1$ and $SW_2$ of the leg 411 and the switching elements $SW_3$ and $SW_4$ of the leg 413 in the power module 4A are in the non-function state. Accordingly, the rectification will be performed by a single three-phase input diode rectifier.

When the load (motor) is breaking, the leg 413 is in the non-function state, while the legs 411 and 412 can provide the current path for returning the back EMF energy to the power network. This configuration can also prevent the voltage on the capacitor 421 from exceeding its rated values.

Figure 4B:
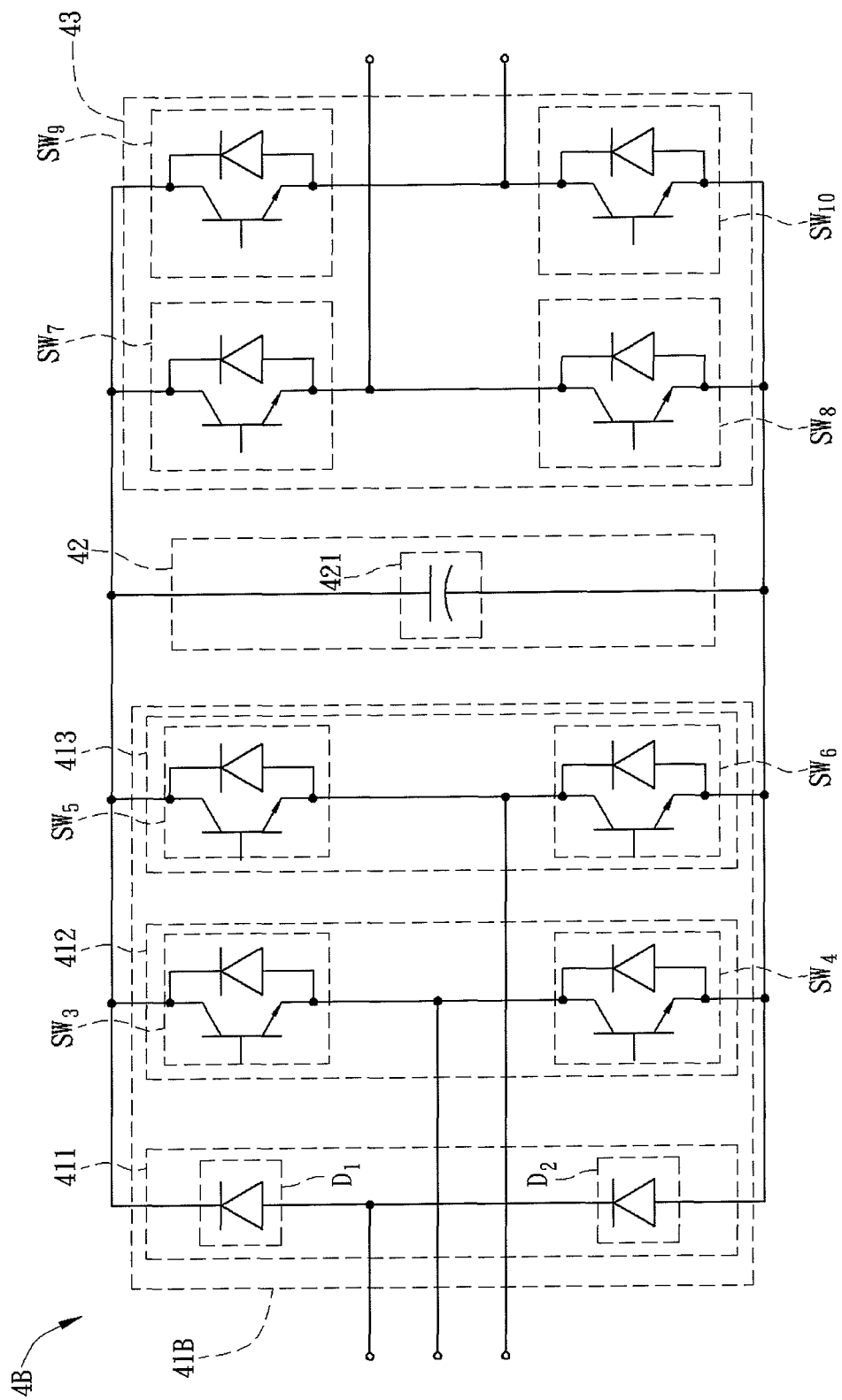
FIGS. 4B and 4C are schematic diagrams showing different aspects of the power module of FIG. 4A according to the preferred embodiment of the present invention.
Figure 4C:
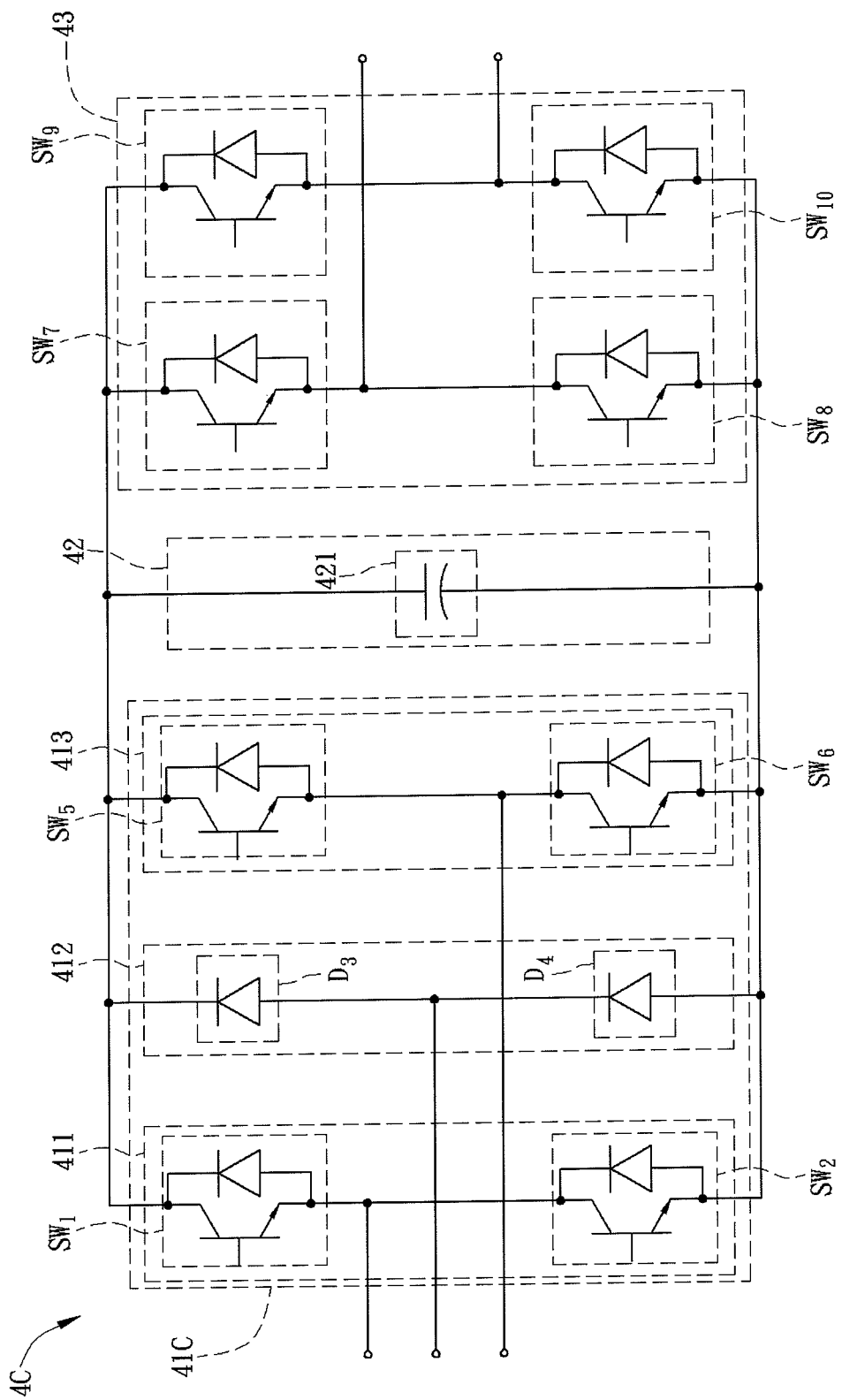

FIGS. 4B and 4C are schematic diagrams showing different aspects of the power module. As shown in FIG. 4B, a power module 4B comprises a rectifying unit 41B, a filtering unit 42 and an inverter 43. In the rectifying unit 41B, the leg 411 comprises two rectifying elements $D_1$ and $D_2$, which are connected in series. The leg 412 comprises two switching elements $SW_3$ and $SW_4$, which are connected in series. The leg 413 comprises two switching elements $SW_5$ and $SW_6$, which are connected in series. The difference between the power modules 4A and 4B is in that the leg 411 of the rectifying unit 41B has two rectifying elements $D_1$ and $D_2$, but the leg 413 of the rectifying unit 41A has two rectifying elements $D_5$ and $D_6$.

Referring to FIG. 4C, a power module 4C comprises a rectifying unit 41C, a filtering unit 42 and an inverter 43. In the rectifying unit 41C, the leg 411 comprises two switching elements $SW_1$ and $SW_2$, which are connected in series. The leg 412 comprises two rectifying elements $D_3$ and $D_4$, which are connected in series. The leg 413 comprises two switching elements $SW_5$ and $SW_6$, which are connected in series. The difference between the power modules 4A and 4C is in that the leg 412 of the rectifying unit 41C has two rectifying elements $D_3$ and $D_4$, but the leg 413 of the rectifying unit 41A has two rectifying elements $D_5$ and $D_6$.

Figure 5:
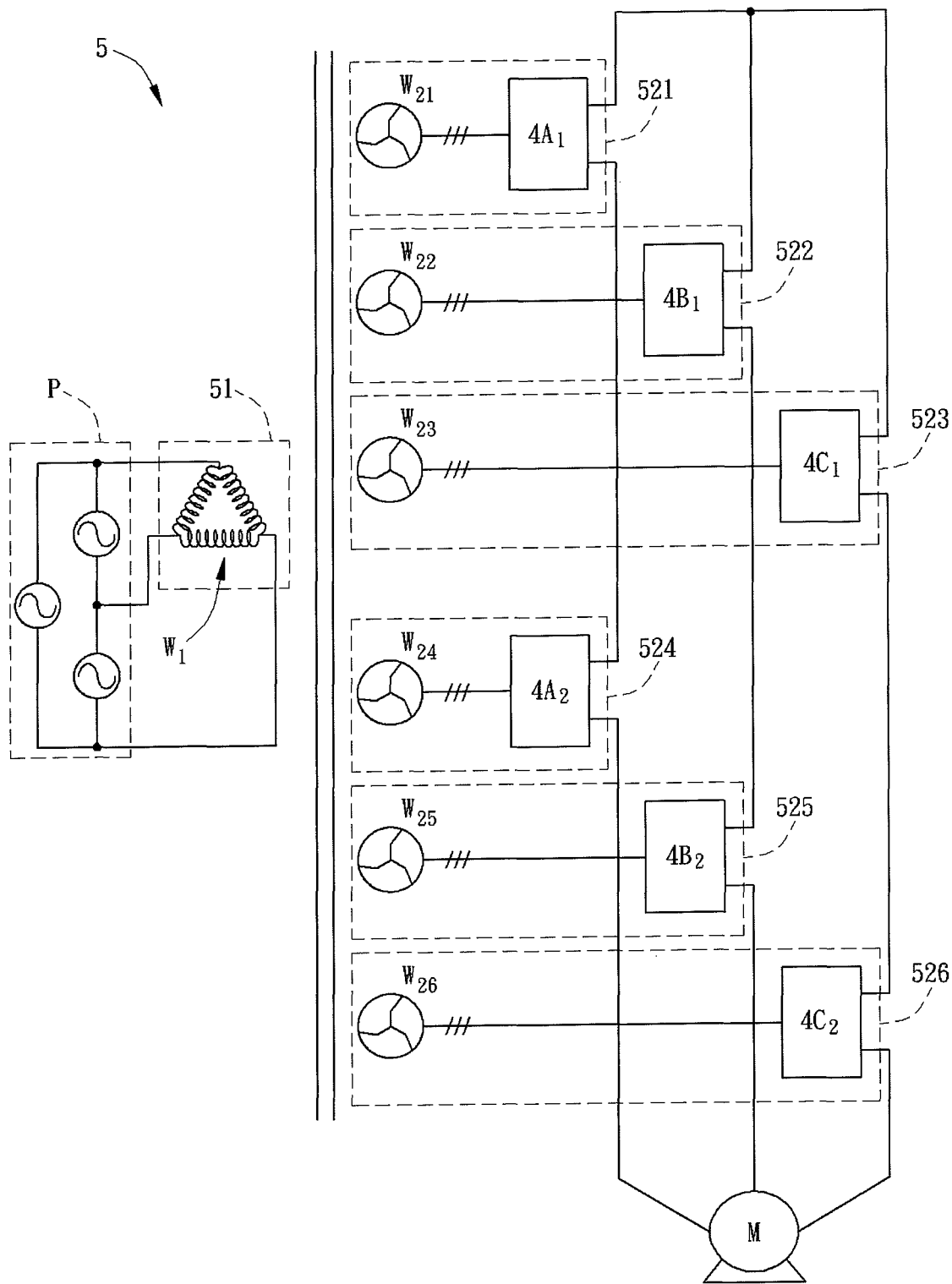
FIG. 5 is a schematic diagram showing another power conversion apparatus according to the preferred embodiment of the present invention.

A power conversion apparatus 5 will be described hereinafter with reference to FIG. 5 in view of FIGS. 4A to 4C. The power conversion apparatus 5 is cooperated with a load M for providing the operation voltage to the load M. In this embodiment, the load M is a motor. The power conversion apparatus 5 comprises a primary circuit 51 and six secondary circuits (including a first secondary circuit 521, a second secondary circuit 522, a third secondary circuit 523, a fourth secondary circuit 524, a fifth secondary circuit 525, and a sixth secondary circuit 526.

The primary circuit 51 is connected to an AC power source P and comprises a primary winding $W_1$. In this embodiment, the AC power source P is a three-phase AC power source. The secondary circuits 521~526 are coupled to the primary circuit 51, respectively. Each secondary circuit comprises a secondary winding and a power module. For example, the first secondary circuit 521 comprises a secondary winding $W_{21}$ and a power module $4A_1$. The second secondary circuit 522 comprises a secondary winding $W_{22}$ and a power module $4B_1$. The third secondary circuit 523 comprises a secondary winding $W_{23}$ and a power module $4C_1$. The fourth secondary circuit 424 comprises a secondary winding $W_{24}$ and a power module $4A_2$. The fifth secondary circuit 425 comprises a secondary winding $W_{25}$ and a power module $4B_2$. The sixth secondary circuit 426 comprises a secondary winding $W_{26}$ and a power module $4C_2$.

In this embodiment, the power module $4A_1$ of the first secondary circuit 521 and the power module $4A_2$ of the fourth secondary circuit 524 are configured as the power module 4A shown in FIG. 4A, the power module $4B_1$ of the second secondary circuit 522 and the power module $4B_2$ of the fifth secondary circuit 525 are configured as the power module 4B shown in FIG. 4B, and the power module $4C_1$ of the third secondary circuit 523 and the power module $4C_2$ of the sixth secondary circuit 526 are configured as the power module 4C shown in FIG. 4C.

In the secondary circuits 521 to 526, the power modules corresponding to the same output phase (e.g. the power module $4A_1$ vs. the power module $4A_2$) have the rectifying units with three legs configured at the same relative positions, while the power modules corresponding to different output phases (e.g. the power module $4A_1$ vs. the power module $4B_1$, $4B_2$, $4C_1$ or $4C_2$) have the rectifying units with three legs configured at different relative positions.

When the load M generates the back EMF, the input current of each of the power modules $4A_1$, $4A_2$, $4B_1$, $4B_2$, $4C_1$ and $4C_2$ is a single-phase current. Accordingly, the three-phase current can be properly balanced by adjusting the relative positions of the leg(s) composed of rectifying elements.

In summary, the power module and power conversion apparatus of the present invention is configured with a rectifying unit having three legs, wherein one of the three legs has two switching elements and another one of the three legs has two rectifying elements. According to this configuration, the circuit design of the power module and power conversion apparatus can be simplified, thereby increasing their reliabilities.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A power apparatus, comprising:
a primary circuit connected to an AC power source and comprising a primary winding; and
a plurality of secondary circuits coupled to the primary circuit, wherein each of the secondary circuits comprises a secondary winding and at least one power module corresponding to one output phase, and the power module comprises:
a rectifying unit connected to the secondary winding and comprising three legs,
a filtering unit connected to the rectifying unit in parallel, and
an inverter connected to the filtering unit,
wherein, one of the three legs comprises two switching elements connected in series, and another one of the three legs comprises two rectifying elements connected in series,
wherein the filtering unit comprises:
a first capacitor;
a second capacitor electrically connected in series with the first capacitor; and
a neutral point disposed between the first capacitor and the second capacitor and electrically connected to the secondary winding.

2. The power apparatus of claim 1, wherein the other one of the three legs of the rectifying unit comprises two rectifying elements connected in series.

3. The power apparatus of claim 2, wherein different rectifying units of different power modules corresponding to different output phases comprise the legs, which have two switching elements, configured at different relative positions.

4. The power apparatus of claim 2, wherein the different rectifying units of the different power modules corresponding to same phase comprise the legs, which have two switching elements, configured at the same relative positions.

* * * * *